(12) United States Patent
Killilea et al.

(10) Patent No.: US 9,133,064 B2
(45) Date of Patent: Sep. 15, 2015

(54) COATING SYSTEM FOR CEMENT COMPOSITE ARTICLES

(75) Inventors: T. Howard Killilea, North Oaks, MN (US); Kevin W. Evanson, Maple Grove, MN (US); Danny G. Hartinger, Hudson, WI (US)

(73) Assignee: Valspar Sourcing, Inc., Minneapolis, MN (US)

( * ) Notice: Subject to any disclaimer, the term of this patent is extended or adjusted under 35 U.S.C. 154(b) by 195 days.

(21) Appl. No.: 13/131,005

(22) PCT Filed: Nov. 24, 2009

(86) PCT No.: PCT/US2009/065811
§ 371 (c)(1),
(2), (4) Date: May 24, 2011

(87) PCT Pub. No.: WO2010/060109
PCT Pub. Date: May 27, 2010

(65) Prior Publication Data
US 2011/0236693 A1 Sep. 29, 2011

Related U.S. Application Data

(60) Provisional application No. 61/117,551, filed on Nov. 24, 2008.

(51) Int. Cl.
*B05D 5/00* (2006.01)
*C09D 133/14* (2006.01)
*C09D 113/02* (2006.01)
(Continued)

(52) U.S. Cl.
CPC ............ *C04B 41/71* (2013.01); *C04B 41/009* (2013.01); *C04B 41/52* (2013.01); *Y10T 428/31598* (2015.04)

(58) Field of Classification Search
CPC ...... C04B 41/009; C04B 41/52; C04B 41/71; C04B 41/483; C04B 41/4884; C04B 41/502; C04B 41/5092; C04B 41/5089; C04B 41/522; C04B 20/0048; C04B 28/02; C09J 175/04
USPC ............. 428/425.5; 427/393.6, 301; 524/558, 524/401, 442
See application file for complete search history.

(56) References Cited

U.S. PATENT DOCUMENTS 2,128,961 A 9/1938 Patterson
2,356,542 A 8/1944 Sloan
(Continued)

FOREIGN PATENT DOCUMENTS

AU 198060655 A1 3/1981
AU 2005100347 B4 5/2005
(Continued)

OTHER PUBLICATIONS

PQ® Potassium Silicates, PQ Corporation Brochure, 2004.
(Continued)

*Primary Examiner* — Thao T Tran
(74) *Attorney, Agent, or Firm* — IPLM Group, P.A.

(57) ABSTRACT

A substrate may be coated with a various combinations of a water-dispersible polyisocyanate, a water-soluble acid or salt thereof, and/or an isocyanate-reactive compound. The resulting coated article has improved coating adhesion, especially near coated burnished surfaces such as sawn edges or grooves.

18 Claims, 1 Drawing Sheet

(51) Int. Cl.
*C08K 3/32* (2006.01)
*C08K 3/34* (2006.01)
*C04B 41/71* (2006.01)
*C04B 41/00* (2006.01)
*C04B 41/52* (2006.01)

(56) References Cited

U.S. PATENT DOCUMENTS

| | | |
|---|---|---|
| 2,633,458 A | 3/1953 | Shokal |
| 2,674,775 A | 4/1954 | Willson |
| 2,727,012 A | 12/1955 | Treat et al. |
| 2,730,517 A | 1/1956 | Vogel et al. |
| 3,010,919 A | 11/1961 | MacKinney et al. |
| 3,049,458 A | 8/1962 | Willard |
| 3,091,551 A | 5/1963 | Robertson |
| 3,219,467 A | 11/1965 | Redican et al. |
| 3,380,831 A | 4/1968 | Cohen et al. |
| 3,449,161 A | 6/1969 | Hindersinn et al. |
| 3,481,894 A | 12/1969 | Lima et al. |
| 3,655,423 A | 4/1972 | Lin et al. |
| 3,781,396 A | 12/1973 | Okuda et al. |
| 3,804,735 A | 4/1974 | Radlove et al. |
| 3,899,611 A | 8/1975 | Hall |
| 3,935,173 A | 1/1976 | Ogasawara et al. |
| 3,935,364 A | 1/1976 | Prokesh et al. |
| 3,952,032 A | 4/1976 | Vrancken et al. |
| 3,970,628 A | 7/1976 | Connelly et al. |
| 3,986,996 A | 10/1976 | Villa et al. |
| 3,991,136 A | 11/1976 | Dalton et al. |
| 4,015,040 A | 3/1977 | Hoshida et al. |
| 4,028,294 A | 6/1977 | Brown et al. |
| 4,113,893 A | 9/1978 | Hahn |
| 4,132,526 A | 1/1979 | Schwarz et al. |
| 4,197,389 A | 4/1980 | Becker et al. |
| 4,211,848 A | 7/1980 | Blount |
| 4,228,761 A | 10/1980 | Glover et al. |
| 4,324,822 A | 4/1982 | Kobayashi et al. |
| 4,333,867 A | 6/1982 | Sauntson |
| 4,385,152 A | 5/1983 | Boyack et al. |
| 4,390,688 A | 6/1983 | Walz et al. |
| 4,408,018 A | 10/1983 | Bartman et al. |
| 4,486,553 A | 12/1984 | Wesch |
| 4,522,962 A | 6/1985 | Abbey et al. |
| 4,528,307 A | 7/1985 | Fuhr et al. |
| 4,536,534 A | 8/1985 | Singer et al. |
| 4,582,755 A | 4/1986 | Dietrich |
| 4,598,108 A | 7/1986 | Hoefs |
| 4,719,149 A | 1/1988 | Aasen et al. |
| 4,737,577 A | 4/1988 | Brown |
| 4,742,121 A | 5/1988 | Toman |
| 4,782,109 A | 11/1988 | DuLaney et al. |
| 4,791,152 A | 12/1988 | Adeney et al. |
| 4,822,828 A | 4/1989 | Swofford |
| 4,822,858 A | 4/1989 | Pivotto et al. |
| 4,852,316 A | 8/1989 | Webb |
| 4,880,660 A | 11/1989 | Aasen et al. |
| 4,886,852 A | 12/1989 | Numa |
| 4,904,522 A | 2/1990 | Markusch |
| 4,908,229 A | 3/1990 | Kissel |
| 4,916,004 A | 4/1990 | Ensminger et al. |
| 5,017,632 A | 5/1991 | Bredow et al. |
| 5,034,459 A | 7/1991 | Haaf et al. |
| 5,073,578 A | 12/1991 | Boodaghains et al. |
| 5,075,370 A | 12/1991 | Kubitza et al. |
| 5,100,948 A | 3/1992 | Aydin et al. |
| 5,157,074 A | 10/1992 | Metzger et al. |
| 5,191,012 A | 3/1993 | Markusch et al. |
| 5,212,230 A | 5/1993 | Tirpak et al. |
| 5,221,710 A | 6/1993 | Markusch et al. |
| 5,236,994 A | 8/1993 | Markusch et al. |
| 5,262,444 A | 11/1993 | Rusincovitch et al. |
| 5,296,530 A | 3/1994 | Bors et al. |
| 5,356,716 A | 10/1994 | Patel |
| 5,371,148 A | 12/1994 | Taylor et al. |
| 5,407,783 A | 4/1995 | Caruso |
| 5,409,984 A | 4/1995 | Gerhardinger |
| 5,418,264 A | 5/1995 | Obloh et al. |
| 5,426,142 A | 6/1995 | Rosano et al. |
| 5,461,125 A | 10/1995 | Lu et al. |
| 5,468,804 A | 11/1995 | Schmalstieg et al. |
| 5,478,601 A | 12/1995 | Larson et al. |
| 5,484,849 A | 1/1996 | Bors et al. |
| 5,500,457 A | 3/1996 | Sarkar et al. |
| 5,534,310 A | 7/1996 | Rokowski et al. |
| 5,559,192 A | 9/1996 | Bors et al. |
| 5,562,953 A | 10/1996 | Bors et al. |
| 5,567,767 A | 10/1996 | Smeal et al. |
| 5,569,686 A | 10/1996 | Makati et al. |
| 5,571,863 A | 11/1996 | Smeal et al. |
| 5,672,379 A | 9/1997 | Schall et al. |
| 5,679,721 A | 10/1997 | Courtoy et al. |
| 5,681,385 A | 10/1997 | Beckenhauer |
| 5,688,867 A | 11/1997 | Scheibelhoffer et al. |
| 5,708,077 A | 1/1998 | Nölken et al. |
| 5,708,093 A | 1/1998 | Bastelberger et al. |
| 5,718,943 A | 2/1998 | Hsu et al. |
| 5,744,078 A | 4/1998 | Soroushian et al. |
| 5,766,768 A | 6/1998 | Cummings et al. |
| 5,777,053 A | 7/1998 | McBain et al. |
| 5,780,117 A | 7/1998 | Swartz et al. |
| 5,798,426 A | 8/1998 | Anton et al. |
| 5,814,397 A | 9/1998 | Cagliostro et al. |
| 5,859,095 A | 1/1999 | Moyle et al. |
| 5,869,590 A | 2/1999 | Clark et al. |
| 5,874,503 A | 2/1999 | Scheibelhoffer et al. |
| 5,928,778 A | 7/1999 | Takahashi et al. |
| 5,945,044 A | 8/1999 | Kawai et al. |
| 5,962,571 A | 10/1999 | Overbeck et al. |
| 5,973,068 A | 10/1999 | Yamaya et al. |
| 5,994,428 A | 11/1999 | Lutz et al. |
| 5,997,952 A | 12/1999 | Harris et al. |
| 6,007,619 A | 12/1999 | Laas et al. |
| 6,008,289 A | 12/1999 | König et al. |
| 6,011,078 A | 1/2000 | Reich et al. |
| 6,028,155 A | 2/2000 | Collins et al. |
| 6,030,447 A | 2/2000 | Naji et al. |
| 6,045,871 A | 4/2000 | Matt et al. |
| 6,045,873 A | 4/2000 | Adachi et al. |
| 6,048,471 A | 4/2000 | Henry |
| 6,063,864 A | 5/2000 | Mathur et al. |
| 6,103,352 A | 8/2000 | Takahashi |
| 6,114,440 A | 9/2000 | Yamaya et al. |
| 6,136,383 A | 10/2000 | Schwartz et al. |
| 6,146,710 A | 11/2000 | Symons |
| 6,146,711 A | 11/2000 | Courtoy et al. |
| 6,162,511 A | 12/2000 | Garnett et al. |
| 6,235,228 B1 | 5/2001 | Nicholl et al. |
| 6,297,320 B1 | 10/2001 | Tang et al. |
| 6,346,146 B1 | 2/2002 | Duselis et al. |
| 6,395,827 B1 | 5/2002 | Pears et al. |
| 6,398,976 B1 | 6/2002 | Sandoval et al. |
| 6,417,267 B1 | 7/2002 | Stockl et al. |
| 6,426,414 B1 | 7/2002 | Laas et al. |
| 6,453,960 B1 | 9/2002 | Kondo et al. |
| 6,458,250 B1 | 10/2002 | Holliday et al. |
| 6,475,556 B1 | 11/2002 | Sobczak et al. |
| 6,485,601 B1 | 11/2002 | Egan et al. |
| 6,485,793 B1 | 11/2002 | Ott et al. |
| 6,492,450 B1 | 12/2002 | Hsu |
| 6,506,248 B1 | 1/2003 | Duselis et al. |
| 6,528,610 B1 | 3/2003 | Froulin et al. |
| 6,534,176 B2 | 3/2003 | Terase et al. |
| 6,555,625 B1 | 4/2003 | Overbeek et al. |
| 6,590,025 B1 | 7/2003 | Carlson et al. |
| 6,617,413 B1 | 9/2003 | Bruchmann et al. |
| 6,635,735 B1 | 10/2003 | Zhang et al. |
| 6,638,567 B1 | 10/2003 | Beisele |
| 6,638,998 B2 | 10/2003 | Zhao et al. |
| 6,641,629 B2 | 11/2003 | Muselman et al. |
| 6,649,679 B1 | 11/2003 | Stockl et al. |
| 6,660,386 B2 | 12/2003 | Haque |
| 6,696,518 B1 | 2/2004 | Dersch et al. |
| 6,740,423 B2 | 5/2004 | Murase |
| 6,753,394 B2 | 6/2004 | Weikard et al. |

(56) References Cited

U.S. PATENT DOCUMENTS

| | | |
|---|---|---|
| 6,762,230 B2 | 7/2004 | Brandenburger et al. |
| 6,777,458 B1 | 8/2004 | Jaworek et al. |
| 6,818,697 B2 | 11/2004 | Zhang et al. |
| 6,849,338 B2 | 2/2005 | Clemens et al. |
| 6,893,751 B2 | 5/2005 | Naji et al. |
| 6,941,720 B2 | 9/2005 | DeFord et al. |
| 6,998,012 B2 | 2/2006 | Koelliker et al. |
| 7,049,352 B2 | 5/2006 | Gould et al. |
| 7,101,921 B2 | 9/2006 | Edwards et al. |
| 7,105,593 B2 | 9/2006 | Solomon et al. |
| 7,148,270 B2 | 12/2006 | Bowe |
| 7,235,595 B2 | 6/2007 | Hermes et al. |
| 7,235,603 B2 | 6/2007 | Madle et al. |
| 7,238,391 B2 | 7/2007 | Dargontina et al. |
| 7,247,671 B2 | 7/2007 | Overbeek et al. |
| 7,265,166 B2 | 9/2007 | Gebhard et al. |
| 7,338,989 B2 | 3/2008 | Gross et al. |
| 7,381,785 B2 | 6/2008 | Detrembleur et al. |
| 7,449,516 B2 | 11/2008 | Bayer et al. |
| 7,758,954 B2 | 7/2010 | Nguyen et al. |
| 7,812,090 B2 | 10/2010 | Killilea et al. |
| 7,968,641 B2 | 6/2011 | Killilea |
| 2002/0007009 A1 | 1/2002 | Stark et al. |
| 2002/0009622 A1 | 1/2002 | Goodson |
| 2002/0081437 A1 | 6/2002 | Dargontina et al. |
| 2002/0179240 A1 | 12/2002 | Clemens et al. |
| 2002/0195191 A1 | 12/2002 | Weiss et al. |
| 2003/0027915 A1 | 2/2003 | Gerst et al. |
| 2003/0055171 A1 | 3/2003 | Overbeek et al. |
| 2003/0073778 A1 | 4/2003 | Zhang et al. |
| 2003/0089061 A1 | 5/2003 | DeFord et al. |
| 2003/0150359 A1 | 8/2003 | Lassman |
| 2003/0153673 A1 | 8/2003 | Schwalm et al. |
| 2003/0203991 A1 | 10/2003 | Schottman et al. |
| 2003/0207121 A1 | 11/2003 | McGee |
| 2003/0211346 A1 | 11/2003 | Kausch |
| 2003/0224184 A1 | 12/2003 | Hermes et al. |
| 2004/0002559 A1 | 1/2004 | Troutman et al. |
| 2004/0044094 A1 | 3/2004 | Garnett |
| 2004/0063809 A1* | 4/2004 | Fu et al. ............. 523/160 |
| 2004/0068045 A1 | 4/2004 | Betremieux et al. |
| 2004/0077782 A1 | 4/2004 | Heldmann et al. |
| 2004/0082715 A1 | 4/2004 | Bayer et al. |
| 2004/0086676 A1 | 5/2004 | Peng |
| 2004/0161542 A1 | 8/2004 | Ziemann et al. |
| 2004/0176502 A1 | 9/2004 | Raymond et al. |
| 2004/0198903 A1 | 10/2004 | Madle et al. |
| 2004/0229978 A1 | 11/2004 | Bowe |
| 2005/0009954 A1 | 1/2005 | Gebhard et al. |
| 2005/0020718 A1 | 1/2005 | Gosse et al. |
| 2005/0027079 A1 | 2/2005 | Palmer Lauer et al. |
| 2005/0053797 A1 | 3/2005 | Rumph et al. |
| 2005/0126430 A1 | 6/2005 | Lightner, Jr. et al. |
| 2005/0176321 A1 | 8/2005 | Crette et al. |
| 2005/0203211 A1 | 9/2005 | Gebhard |
| 2005/0208285 A1 | 9/2005 | Lyons et al. |
| 2006/0013950 A1 | 1/2006 | Porter et al. |
| 2006/0024480 A1 | 2/2006 | Lyons et al. |
| 2006/0046068 A1 | 3/2006 | Barancyk et al. |
| 2006/0048708 A1 | 3/2006 | Hartig |
| 2006/0111503 A1 | 5/2006 | Killilea et al. |
| 2006/0135684 A1 | 6/2006 | Killilea |
| 2006/0135686 A1 | 6/2006 | Killilea et al. |
| 2006/0182946 A1 | 8/2006 | Zarb et al. |
| 2006/0288909 A1 | 12/2006 | Naji et al. |
| 2007/0027233 A1 | 2/2007 | Yamaguchi et al. |
| 2007/0042192 A1 | 2/2007 | Nguyen et al. |
| 2007/0110981 A1 | 5/2007 | Killilea et al. |
| 2007/0149077 A1 | 6/2007 | Stanislawczyk et al. |
| 2007/0213445 A1 | 9/2007 | Klijn et al. |
| 2007/0259166 A1 | 11/2007 | Killilea et al. |
| 2007/0259188 A1* | 11/2007 | Wu et al. ............. 428/423.1 |
| 2007/0269660 A1 | 11/2007 | Killilea et al. |
| 2007/0282046 A1 | 12/2007 | Killilea et al. |
| 2008/0008895 A1 | 1/2008 | Garner et al. |
| 2008/0139737 A1 | 6/2008 | Alderfer et al. |
| 2008/0141908 A1 | 6/2008 | Peng et al. |
| 2008/0275155 A1* | 11/2008 | Wagner et al. ............. 522/174 |
| 2008/0300338 A1* | 12/2008 | Wagner et al. ............. 522/107 |
| 2009/0004468 A1* | 1/2009 | Chen et al. ............. 428/351 |

FOREIGN PATENT DOCUMENTS

| | | |
|---|---|---|
| CN | 1182724 A | 5/1998 |
| DE | 33 02 767 A1 | 8/1984 |
| EP | 0 060 505 A1 | 9/1982 |
| EP | 0 486 278 A1 | 5/1992 |
| EP | 0 623 659 A2 | 11/1994 |
| EP | 0 640 629 A1 | 3/1995 |
| EP | 0 697 417 A1 | 2/1996 |
| EP | 0 705 855 A2 | 4/1996 |
| EP | 0 725 088 A1 | 8/1996 |
| EP | 0 728 779 B2 | 8/1996 |
| EP | 0 757 059 A1 | 2/1997 |
| EP | 0 894 780 A1 | 2/1999 |
| EP | 1 118 632 A2 | 7/2001 |
| EP | 1 170 340 A1 | 1/2002 |
| EP | 1 454 935 A1 | 9/2004 |
| EP | 1 473 331 A1 | 11/2004 |
| EP | 1 505 088 A1 | 2/2005 |
| EP | 1 505 127 A1 | 2/2005 |
| EP | 1 589 083 A2 | 10/2005 |
| EP | 1 650 045 A2 | 4/2006 |
| EP | 1 798 258 A1 | 6/2006 |
| GB | 1 407 827 | 9/1975 |
| GB | 2 148 871 A | 6/1985 |
| JP | 54 038323 | 3/1979 |
| JP | 01 229242 | 9/1989 |
| JP | 02 308887 | 12/1990 |
| JP | 08 059939 | 3/1996 |
| JP | 11 236281 | 8/1999 |
| JP | 03 44986 A | 12/2000 |
| JP | 2003 226835 A | 8/2003 |
| JP | 2003 251269 | 9/2003 |
| JP | 2004 010805 A | 1/2004 |
| JP | 2004 250607 A2 | 9/2004 |
| JP | 2004 292748 A2 | 10/2004 |
| JP | 2005 307161 | 4/2005 |
| JP | 2006 117812 | 5/2006 |
| SU | 833892 | 5/1981 |
| WO | WO 94/07674 A1 | 4/1994 |
| WO | WO 94/25499 A1 | 11/1994 |
| WO | WO 98/45222 | 10/1998 |
| WO | WO 99/67312 | 12/1999 |
| WO | WO 00/23495 A1 | 4/2000 |
| WO | WO 00/56826 | 9/2000 |
| WO | WO 01/68547 A1 | 9/2001 |
| WO | WO 02/070623 A2 | 9/2002 |
| WO | WO 03/000761 A1 | 1/2003 |
| WO | WO 03/076536 A1 | 9/2003 |
| WO | WO 03/101918 A2 | 12/2003 |
| WO | WO/2004108825 | 12/2004 |
| WO | WO 2005/071179 A1 | 8/2005 |
| WO | WO 2006/032512 A1 | 3/2006 |
| WO | WO 2006/065914 A1 | 6/2006 |
| WO | WO 2007/059516 A1 | 5/2007 |
| WO | WO 2007/087458 A1 | 8/2007 |
| WO | WO 2007/089807 A2 | 8/2007 |
| WO | WO 2007/089913 A1 | 8/2007 |
| WO | WO 2007/090132 A1 | 8/2007 |
| WO | WO 2008/018910 A2 | 2/2008 |

OTHER PUBLICATIONS

ASTM D6944-03, Test Method A.

Koleske et al., *Two Thousand Three Additives Guide*, Paint and Coatings Industry, Apr. 2003, pp. 1-76.

Witzeman, J. S. et al., *Comparison of Methods for the Preparation of Acetoacetylated Coating Resins*, Coatings Technology; vol. 62, No. 789, Oct. 1990, pp. 101-112 (and references contained therein).

Clemens, R. J. et al., *A Comparison of Catalysts for Crosslinking Acetoacetylated Resins via the Michael Reaction*, Journal of Coatings Technology, Mar. 1989, vol. 61, No. 770, pp. 83-91.

(56) References Cited

OTHER PUBLICATIONS

Clemens, R. J., *A Comparison of Catalysts for Crosslinking Acetoacetylated Resins via the Michael Reaction*, Water-Borne & Higher Solids Coatings Symposium, 1988, New Orleans, LA, 55-67.
Wicks, Z.W. et al., *Epoxy and Phenolic Resins*, Organic Coatings Science and Technology, vol. 1, Chapter XI, pp. 162-187.
Tennebroek et al., *New Polymer Synthesis for (self) Crosslinkable Urethanes and Urethane Acrylics*, 4th Nürnberg Congress; International Centre for Coatings Technology, Paper 17, 2000, 19 pages.
Geurts, J.M. et al., *Self-crosslinkable Urethanes and Urethane/Acrylics*, Verfkroniek Nummer, Jan. 1999.
Geon® Lo-Sope Dispersion Resin, Geon® 171 Vinyl Chloride Homopolymer Technical Data Sheet, PolyOne Corporation, May 2003, 2 pages.
Geon Copolymer Dispersion Resin Geon® 137 Vinyl Chloride Copolymer Technical Data Sheet, PolyOne Corporation, Apr. 1997, 2 pages.
Industrial Research Services, *Test Report No. 54703-1 for Epirez Safe Step 100*, CSIRO, Manuf. & Infrastr. Technology, Australia, May 2004, pp. 1-6.
DSM NeoResins, Technical Data Sheet, DSM NeoResins Inc.,Bulletin XK-90, Jan. 2006, 6 pages.
Tex•Cote® Stretch Product Information, Textured Coatings of America, Inc., Panama City, Florida, Nov. 2003, 3 pages.
UCAR Emulsion Systems Applications, *Architectural Coatings-Exterior-Cement Fiber Board*, Dow Chemical Company product information sheet printed on Oct. 25, 2007 from the following internet archives website at: http://web.archive.org/web/20041022123748/http://www.dow.com/ucarlatex/app/arch/ex_fiber.htm.
Rector, F.D. et al., *Applications for the Acetoacetyl Chemistry in Thermoset Coatings*, Journal of Coatings Technology, vol. 61, No. 771, Apr. 1989.
"UV Cured Undercoat Vitrecure 7", Product Data Sheet 74, Architectural & Industrial Coatings, 1 page (Dec. 21, 2004).
"UV Cured Sealer for Cement Based Substrates Vitrecure 9", Product Data Sheet 54, Architectural & Industrial Coatings, 1 page (Jul. 24, 2004).
American Society of Testing Materials, ASTM Designation: D523-89, "Standard Test Method for Specular Gloss;" 5 pages, (Reapproved 1999).
American Society of Testing Materials, ASTM Designation: D5402-93, "Standard Practice for Assessing the Solvent Resistance of Organic Coatings Using Solvent Rubs;" 3 pages, (Reapproved 1999).
Eastman Chemical Company, Publications N-319C, Kingport, TN., Title Page, Table of Contents, "Acetoacetoxyethyl Methacrylate (AAEM) Acetoacetyl Chemistry," pp. 1-11, (Dec. 1999).
Lewis et al., "Luminescence", Hawley's Condensed Chemical Dictionary, 14th Ed., John Wiley and Sons, Inc., retrieved from Knovel® online; 1 page (2002).
"Photoinitiators for UV Curing," "Darocur 1173", p. 2; Ciba Specialty Chemicals; 8 pages (2003).
U.S. Federal Register, vol. 60, No. 116, pp. 31633-31637, (Jun. 16, 1995).
Wicks, Zeno W. Jr., et al., "Latexes", Organic Coatings, Science and Technology, Second Edition, (Wiley-Interscience, New York), Title Page, Copyright Page, Chapter 8, p. 143, (1999).
Dow® Z-6018 Intermediate Product Information, "Silicone Intermediates", 3 pgs., (Aug. 28, 2006).
"Polycat 41 Catalyst", Product Information Sheet, Air Products and Chemicals, Inc., 2 pages, (2003).
"Ancarez AR550 Waterborne Epoxy Resin Technical Bulletin", Air Products and Chemicals, Inc., High Performance Coatings Resins, Pub. No. 125-9914, 13 pages, (Mar. 2006).
"Anquamine 401 Curing Agent Technical Bulletin", Air Products and Chemicals, Inc., Epoxy Curing Agents and Modifiers, Publication No. 125-9744,1 page, (May 2004).
Hardiplank™ Lap Siding Installation, James Hardie Siding Products, 8 pages, (Dec. 2005), http://www.jameshardie.com/homeowner/technical/installation/hardieplank_installation.php, downloaded from the Dec. 15, 2005 Internet Archive entry at: http://web.archive. org/web/20051215084041/http://www.jameshardie.com/homeowner/installation/hardiplank_installation.php.
"Siding Painting Tips", Paint Manufacturers' Recommendation Sheet—No. S-100, James Hardie Siding Products, 10 pages, (May 2005), http://www.jameshardie.com/homeowner/technical/paintingtips.php, downloaded from the Dec. 14, 2005 Internet Archive entry at: http://web.archive.org/web/20051214022056/http://www.jameshardie.com/homeowner/technical/paintingtips.php.
Epoxy Resins Chemistry and Technology 2nd Edition, Revised and Expanded—Tanaka, Yoshio: Synthesis and Characteristics of Epoxides, p. 54 (1988).
"*ASTM C920-11 Standard Specification for Elastomeric Joint Sealants*" Abstract, Book of Standards, 2 pages, (vol. Apr. 2007).
"*ASTM C834-10 Standard Specification for Latex Sealants*" Abstract, Book of Standards, 2 pages, (vol. Apr. 2007).
Gardner's Commercially Important Chemicals, edited by G.W.A Milne, Wiley, p. 573 (2005).
NaH2PO4 MSDS, found at http://muby.itgo.com/MSDS/sodium_phosphate_monobasic_anhyd%20MSDS.htm.
Technical Bulletin CC 2.0, "Yellowing of Alkyd Paints", Glidden Professional™, Akzo Nobel Paints LLC, 2 pages (Feb. 2010).
Araujo, P.H.H. et al., "Techniques for Reducing Residual Monomer Content in Polymers: A Review", Polymer Engineering and Science, vol. 42, No. 7, pp. 1142-1468 (Jul. 2002).
Michigan State University Extension—Home Maintenance and Repair: Paint Problems, Jun. 24, 2003 and can be found at: http://www.msue.msu.edu/objects/content_revision/download.cfm/revision_id.498884/workspace_id.-4/01500572.html/.
Fox, T. G., "Influence of diluent and of copolymer composition on the glass temperature of a polymer system", Bull. Am. Phys. Soc. I (3), 123 (1956).
EPS 4203 Technical Data Sheet (May 25, 2011).
EPS 4203 Material Safety Data Sheet (May 10, 2013).
EPS 4213 Technical Data Sheet (May 26, 2011).
EPS 4213 Material Safety Data Sheet (May 10, 2013).
Lux 399 Technical Data Sheet (Dec. 15. 2010).
Lux 399 Material Safety Data Sheet (Apr. 29, 2011).
Celanese Emulsions, "Brilliant Aspects" Technical Data Sheets (Feb. 2005).
MaxiTile, Inc. Limited Warranty, MaxiLite P7 and P10, MaxiShake and MaxiSlate, SlateMax and ShakeMax, and SuperTile PVA Reinforced Roofing, 2 pages (2005).
Celanese Emulsions, "Mowilith LDM 7416" Technical Data Sheets, Version 1, 2 pages, Issue Feb. 2005.
Celanese Emulsion Polymers, "Mowilith LDM 7416" Technical Data Sheet, 2 pages, (Jan. 8, 2013).
Celanese Emulsions—Wood Coatings, "Industrial Wood Coatings" sheet downloaded on Aug. 2, 2013 from the Internet Archives at: http://web.archive.org/web/20061016145419/http://www.celanese.com/i.
Dach-Und Fassadenschindeln, Eternit, Preisliste 2002, 4 pages (Jan. 2002).
Highly Durable Non-Abrasive Roof Tiles, pp. 52-56, (May 2004).
Wir bei Eternit Information Sheets, 2 pages, (Aug. 1998).
"Isocyanate", 4 pages, (2015), downloaded from: en.wikipedia.org/wiki/Isocyanate.
"The chemistry of isocyanates", 2 pages, (2013), downloaded from bayercoatings: de/BMS/DB-RSC/BMS_RSC_CAS.nsf/id/PortalEN_The_chemistry_of_isocyanates.
"Polyurethanes" (2011), 2 pages downloaded from bayermaterialsciencenafta.com/businesses/pur/isocyanates.html.
"Styrene and Functionalized Styrene Monomers" downloaded on Dec. 12, 2014 from the following website: www.sigmaaldrich.com/materials-science/material-science-products.html?TablePage=16371135.
Bayhydur® 305, Water-Dispersible Polyisocyanate, Product Information, Bayer MaterialScience, 2 pages, (Jun. 2010).
Bayhydrol® 140 AQ, Polyurethane Dispersion, Product Information, Bayer MaterialScience, 2 pages, (2013).
Bayhydrol® 110, Polyurethane Dispersion, Product Information, Bayer MaterialScience, 2 pages, (2002).

(56) References Cited

OTHER PUBLICATIONS

Bayhydrol® A 145, Hydroxy-Functional Polyacrylic Dispersion, Bayer MaterialScience, Product Information Sheets, 2 sheets, (2013).
Bayhydur® 302, Water-Dispersible Polyisocyanate, Product Information, Bayer MaterialScience, 2 pages, (2012).
Bayhydur® 303, Water-Dispersible Polyisocyanate, Product Information, Bayer MaterialScience, 2 pages, (2012).
Bayhydur® 304, Water-Dispersible Polyisocyanate, Product Information, Bayer MaterialScience, 2 pages, (2012).
CAPS (buffer) definition, Wikipedia, downloaded from: en.wikipedia.org/wiki/CAPS_(buffer), 2 pages, (May 28, 2014).
62314-22-1 (2-hydroxypropyl)trimethylammonium 2-ethylhexanoate, Product Information, cas.ChemNet.com, 1 page, (2014).
Sigma-Aldrich Company, Bis(2-ethylhexyl) phosphate, Product Information Sheet, 1 page, (2014).
Sigma-Aldrich Company, N,N-Dimethylcyclohexylamine, Product Information Sheet, 2 pages, (2014).
Bayhydur®, Bayhydrol®, Brochure entitled "Two-Component Waterborne Polyurethane High Performance Coatings for Flooring", Bayer MaterialScience, 8 pages, (Jul. 2009).

* cited by examiner

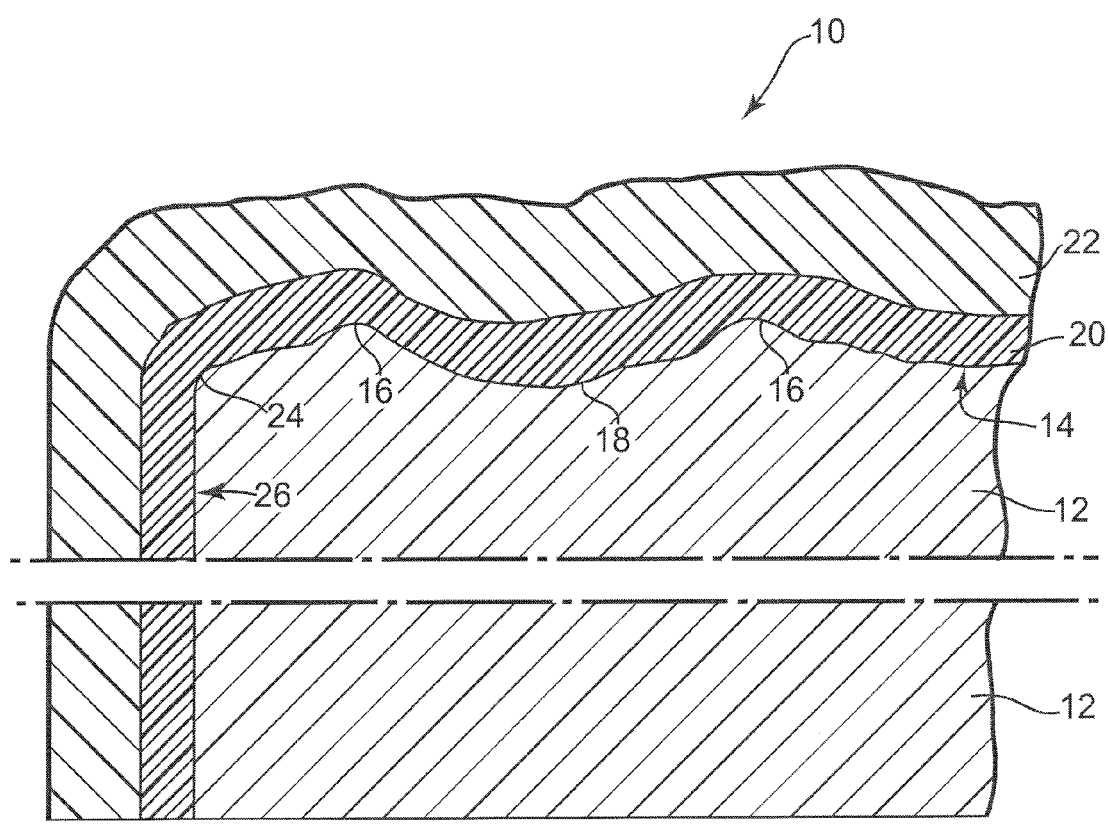

COATING SYSTEM FOR CEMENT COMPOSITE ARTICLES

CROSS REFERENCE TO RELATED APPLICATION

This application is national stage filing under 35 U.S.C. §371 of International Application No. PCT/US2009/065811 filed 24 Nov. 2009, which claims priority under 35 U.S.C. §119 to U.S. Provisional Application No. 61/117,551 filed 24 Nov. 2008.

BACKGROUND

Fiber cement composite siding is a high quality building material having many advantages over vinyl, aluminum or wood siding. One major advantage is the significantly better durability of fiber cement siding. Fiber cement siding typically includes a substrate made from wood pulp or synthetic fiber mixed with a binder that includes silica, hydraulic cement and water. The mixture is pressed, cast, molded, roll-formed, extruded or otherwise formed into a green board form and dried. One or both major surfaces of the siding may be profiled or embossed to look like a grained or roughsawn wood or other building product, or scalloped or cut to resemble shingles. A variety of styles or shapes (including lap siding, vertical siding, soffit panels, trim boards, shaped edge shingle replicas and stone or stucco replicas) are available in a variety of sizes and thicknesses. Fiber cement siding may be prefinished (e.g., primed or painted) at the factory where it is made and delivered to a job site ready for installation (viz., attachment) on a building. The resulting prefinished siding product has a primed or painted appearance immediately upon attachment.

Unfortunately, some finishes adhere poorly to fiber cement siding products, especially near edges and corners. An applied finish may initially appear to be properly adhered but may later delaminate or otherwise prematurely fail once the product has been stored, stacked or transported, during product installation, or even after the product has been installed. While builders and homeowners desire the beauty and convenience of fiber cement siding, premature finish failure can defeat the purpose of manufacturing boards with a preapplied finish.

From the foregoing, it will be appreciated that what is needed in the art is a prefinished fiber cement siding product with improved coating adhesion and a reduced tendency to exhibit premature finish failure, especially near edges and corners. Such siding products and methods for preparing the same are disclosed and claimed herein.

SUMMARY

The above-described finish adhesion problems may be aggravated for sawn fiber cement products, especially if the sawing process has burnished the product. For example, some conventional sealers which normally adhere well to the face of a cement board product may exhibit complete or nearly complete coating failure when applied to a sawn region of some cement board products, especially near burnished regions proximate sawn edges, corners or grooves.

The invention provides in one aspect an aqueous coating composition comprising an aqueous mixture of water-dispersible polyisocyanate and water-soluble acid (or salt of such an acid). The disclosed aqueous mixture may optionally include an isocyanate-reactive compound. In a preferred embodiment the optional isocyanate-reactive compound is an isocyanate-reactive emulsion polymer.

The invention provides in another aspect a method for preparing a coating, which method comprises:
  (a) applying to at least a portion of a substrate an aqueous mixture comprising water-dispersible polyisocyanate and water-soluble acid (or salt of such an acid);
  (b) at least partially drying the aqueous mixture; and
  (c) overcoating at least part of such portion with one or more of a sealer, primer or topcoat.

The aqueous mixture in step (a) may optionally include an isocyanate-reactive compound. In a preferred embodiment the optional isocyanate-reactive compound is an isocyanate-reactive emulsion polymer. In another preferred embodiment the substrate is a cementitious substrate, and more preferably the substrate is cement fiberboard. An additional embodiment of the disclosed method further comprises exposing the surface of the applied aqueous mixture to steam, ammonia, an amino compound or other isocyanate-reactive compound before, during or after the drying step, thereby providing a coating having reduced surface tack. In yet another embodiment of the disclosed method, the substrate is a cementitious substrate, and the method further comprises pretreating at least a portion of the substrate with an aqueous solution of an acid (or salt of such an acid), which acid or salt affords improved coating adhesion on a cementitious substrate, optionally at least partially drying the aqueous solution, and then applying such aqueous mixture.

The invention provides in yet another aspect a method for preparing a coating, which method comprises providing a cementitious substrate having at least one outer surface; applying to such surface an aqueous solution of an acid (or salt of such an acid), which acid or salt affords improved coating adhesion on a cementitious substrate, together with or followed by an aqueous coating composition comprising water-dispersible polyisocyanate; exposing the surface of the thus-applied coating to steam, ammonia, an amino compound or other isocyanate-reactive compound, thereby providing a coating having reduced surface tack, and overcoating such reduced surface tack coating with one or more of a sealer, primer or topcoat.

The invention provides in yet another aspect a method for preparing a coating, which method comprises providing a cement fiberboard substrate having at least one burnished edge; applying to one or more such edges an aqueous mixture comprising a water-dispersible polyisocyanate, an isocyanate-reactive emulsion polymer and an optional water-soluble acid or salt thereof; at least partially drying the mixture; and overcoating at least part of such edges with one or more of a sealer, primer or topcoat.

The invention provides in yet another aspect a coated article comprising a cementitious substrate having at least one outer surface at least a portion of which is coated with an aqueous mixture comprising water-dispersible polyisocyanate and water-soluble acid (or salt of such an acid). The aqueous mixture may optionally include an isocyanate-reactive compound. In a preferred embodiment the optional isocyanate-reactive compound is an isocyanate-reactive emulsion polymer.

The above summary of the present invention is not intended to describe each disclosed embodiment or every implementation of the present invention. The description that follows exemplifies several illustrative embodiments. In various places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawing and the description below. Other features, objects, and advantages of the invention will be apparent from the description and drawing, and from the claims.

BRIEF DESCRIPTION OF THE DRAWING

FIG. 1 is a schematic cross-sectional view of a coated fiber cement article.

Like reference symbols in the various figures of the drawing indicate like elements. The elements in the drawing are not to scale.

DETAILED DESCRIPTION

The recitation of a numerical range using endpoints includes all numbers subsumed within that range (e.g., 1 to 5 includes 1, 1.5, 2, 2.75, 3, 3.80, 4, 5, etc.).

The terms or phrases "a," "an," "the," "at least one," and "one or more" are used interchangeably. Thus, for example, a coating composition that contains "an" additive means that the coating composition includes "one or more" additives.

Terms of orientation such as "atop", "on", "uppermost" and the like refer to the relative position of various treatments, layers or coatings in the disclosed articles with respect to a horizontal substrate but do not require that the disclosed articles should have any particular orientation in space during or after their manufacture. A coating "atop" a substrate may be adjacent to the substrate or separated from the substrate by one or more intervening treatments, layers or coatings. A treatment or coating "on" a substrate will unless the context indicates otherwise be adjacent to the substrate.

The terms "board" or "plank" refer to a generally planar component suitable for attachment to a building exterior surface, including lap siding, vertical siding, soffit panels, trim, shingle replicas, stone replicas and stucco replicas.

The terms "burnished" and "burnishing" as used with respect to a cement fiberboard substrate edge, corner or groove refer to any abrasive treatment that will heat (and optionally form) the edge, corner or groove and give it or a surface on, in or proximate the edge, corner or groove a smooth or glossy appearance, such as sawing, sanding, grinding, polishing and the like.

The phrase "chalk resistant" when used with respect to a coating composition means that if the coating composition is applied to and dried or otherwise hardened on a substrate, the coating composition will have a chalk rating not less than 5 (viz., a rating of 5 to 10), more preferably not less than 6 (viz., a rating of 6 to 10) and most preferably not less than 8 (viz., a rating of 8 to 10) when evaluated according to ASTM D4214-07 Test Method A using a 5 year vertical exterior exposure in Florida.

The phrase "color change resistant" when used with respect to a coating composition means that if the coating composition is applied to and dried or otherwise hardened on a substrate, the coating composition will change less than 15 Macadam units, more preferably will change less than 10 Macadam units, and most preferably will change less than 8 Macadam units following a 5 year vertical exterior exposure in Florida.

The term "comprises" and variations thereof does not have a limiting meaning where such term appears in the description or claims. Thus, for example, a composition comprising a wax compound means that the composition includes one or more wax compounds.

The phrase "crack resistant" when used with respect to a coating composition means that if the coating composition is applied to and dried or otherwise hardened on a substrate, the coating composition will have a crack rating not less than 5 (viz., a rating of 5 to 10), more preferably not less than 6 (viz., a rating of 6 to 10) and most preferably not less than 8 (viz., a rating of 8 to 10) when evaluated according to ASTM D661-93 (2005) using a 5 year vertical exterior exposure in Florida.

The phrase "emulsion polymer" means a dispersion or emulsion of polymer particles in water containing one or more secondary dispersing or emulsifying agents (e.g., a surfactant, alkali-soluble polymer or mixtures thereof) whose presence is required to form the dispersion or emulsion. The secondary dispersing or emulsifying agent is typically separate from the polymer after polymer formation. In some embodiments a reactive dispersing or emulsifying agent may become part of the polymer particles as they are formed.

The phrase "flake resistant" when used with respect to a coating composition means that if the coating composition is applied to and dried or otherwise hardened on a substrate, the coating composition will maintain a flake rating not less than 5 (viz., a rating of 5 to 10), more preferably not less than 6 (viz., a rating of 6 to 10) and most preferably not less than 8 (viz., a rating of 8 to 10) when evaluated according to ASTM D772-86 (2005) using a 5 year vertical exterior exposure in Florida.

The term "functionalized" when used with respect to an emulsion polymer means the polymer contains additional pendant reactive chemical moieties other than carboxylic acid groups and linear, branched or ring structures containing $(CH_x)$ groups where x is 0, 1, 2, or 3.

The term "gloss" when used with respect to a coating composition means the 60° measurement obtained when evaluating a smooth region of a cement fiberboard major surface according to ASTM D523-08.

The term "isocyanate-reactive" when used with respect to a polymer or other compound means that the polymer or compound includes one or more active hydrogen atoms that will react with a water-dispersible polyisocyanate, and is not water.

The phrase "low VOC" when used with respect to a liquid coating composition means that the coating composition contains less than about 10 wt. % volatile organic compounds, more preferably less than about 7% volatile organic compounds, and most preferably less than about 4% volatile organic compounds based upon the total liquid coating composition weight.

The phrase "(meth)acrylic acid" includes either or both of acrylic acid and methacrylic acid, and the term "(meth)acrylate" includes either or both of an acrylate and a methacrylate.

The term "multistage" when used with respect to an emulsion polymer (e.g., a latex polymer) means the polymer was made using discrete charges of two or more monomers or was made using a continuously-varied charge of two or more monomers. Usually a multistage emulsion polymer will not exhibit a single Tg inflection point as measured using DSC. For example, a DSC curve for a multistage emulsion polymer made using discrete charges of two or more monomers may exhibit two or more Tg inflection points. Also, a DSC curve for a multistage emulsion polymer made using a continuously-varied charge of two or more monomers may exhibit no Tg inflection points. By way of further explanation, a DSC curve for a single stage emulsion polymer made using a single monomer charge or a non-varying charge of two monomers may exhibit only a single Tg inflection point. Occasionally when only one Tg inflection point is observed it may be difficult to determine whether the emulsion polymer represents a multistage emulsion polymer. In such cases a lower Tg inflection point may sometimes be detected on closer inspection, or the synthetic scheme used to make the emulsion polymer may be examined to determine whether or not a multistage emulsion polymer would be expected to be produced.

The phrase "pot life" means the time period after the ingredients in a coating composition have been mixed together, including if need be any curing agents, energy (e.g., for deblocking, thermal activation or otherwise) or other measures needed to initiate film coalescence or hardening, during which the coating composition can successfully be applied to a cement fiberboard substrate to form a thin, visibly smooth, self-leveling dried film whose properties are generally similar to those exhibited by the coating composition if applied immediately after mixing the ingredients and dried or otherwise hardened.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The terms "pretreatment", "pretreating", "pretreated" "treatment", "treating" and "treated" refer to the application of an acid or salt solution to an edge or surface of a substrate such that after the solution has dried, a locally elevated concentration of the acid, salt or reaction byproduct thereof with the substrate may be detected at the treated edge or surface. The thus-treated edge or surface may accordingly be distinguished from a substrate that may contain nominal amounts of an acid or salt distributed evenly throughout the substrate (e.g., throughout the binder in a cement fiberboard substrate), and may be distinguished from a substrate bearing a coating that may contain nominal amounts of an acid or salt distributed evenly throughout the coating and over coated portions of the substrate.

The treatments and coating compositions described herein may be used in place of or in addition to coatings that may previously have been characterized as "sealers" or "primers", and normally will be overcoated with coatings that may previously have been characterized as "topcoats." However, the disclosed treatments and coating compositions may not fit neatly into any category per se and such terms should not be limiting. With that caveat in mind, the term "sealer" refers to a composition which may be applied on a bare (viz., uncoated) substrate and dried or otherwise hardened to provide a coated surface having reduced porosity; the term "primer" refers to a composition which may be applied atop a substrate and dried or otherwise hardened to provide a coated surface having improved ability to retain a subsequently-applied dried or hardened topcoat; and the term "topcoat" refers to a composition which when dried or otherwise hardened provides a decorative or protective outermost finish layer atop a substrate and especially atop a cement fiberboard substrate which is or will be attached to a building exterior. By way of further explanation, such topcoats include paints, stains or sealers capable of withstanding extended outdoor exposure (e.g., exposure equivalent to one year of vertical south-facing Florida sunlight) without visually objectionable deterioration, but do not include sealers or primers that would not withstand extended outdoor exposure if left uncoated with a topcoat.

The term "unattached" when used with respect to a board or plank means that the board or plank has not been fastened (e.g., nailed, screwed or glued) to a building.

The phase "weather resistant" when used with respect to a coating composition means that the coating composition is at least one or more of (and more preferably at least two or more of, yet more preferably at least three or more of and most preferably all of) chalk resistant, color change resistant, crack resistant or flake resistant when exposed outdoors.

Referring to FIG. 1, a coated article 10 of the present invention is shown in schematic cross-sectional view. Article 10 includes a substrate such as cement fiberboard substrate 12. The first major surface 14 of substrate 12 may be embossed with small peaks or ridges 16 and valleys 18, e.g., so as to resemble roughsawn wood. Major surface 14 may have a variety of other surface configurations, and may for example resemble a variety of other building materials besides roughsawn wood. A sealer layer or layers 20 of the disclosed coating system lies atop and partially penetrates surface 14, and desirably is applied to article 10 at the location where article 10 is manufactured. Sealer 20 provides a firmly-adhered base layer upon which one or more layers of topcoat 22 may be formed, and helps to reduce the amount of topcoat 22 that might soak in or otherwise be absorbed into substrate 12. Topcoat 22 desirably is both decorative and weather-resistant, and may be applied to article 10 at the location where article 10 is manufactured or after article 10 has been attached to a building or other surface. Article 10 also includes at least one edge such as edge 24 between first major surface 14 and a side surface of article 10 such as side surface 26. It will be understood by persons having ordinary skill in the art that edge 24 may have a sharp or somewhat rounded configuration but will in any event represent a transition region of relatively high curvature (viz., low radius of curvature) between major surface 14 and side surface 26. Persons having ordinary skill in the art will understand that article 10 may have elongated and generally parallel side surfaces intersected by shorter end surfaces, and that these side and end surfaces may be largely hidden when article 10 is installed, e.g., on a building.

Persons having ordinary skill in the art will understand that article 10 may have fewer, more or other layers than are shown in FIG. 1, and that in the interest of brevity these and other variations need not be separately shown in the Drawing. For example, in a first exemplary embodiment the substrate is coated with a sealing layer containing a first aqueous mixture of water-dispersible polyisocyanate and an acid (or salt of such an acid) that affords improved coating adhesion on a cementitious substrate, at least partially dried, and then overcoated with one or more topcoat layers. In a second exemplary embodiment the substrate is coated with a sealing layer containing a second aqueous mixture of water-dispersible polyisocyanate, an acid (or salt of such an acid) that affords improved coating adhesion on a cementitious substrate, and an isocyanate-reactive emulsion polymer; at least partially dried; and then overcoated with one or more topcoat layers. Preferably the various layers in these and other embodiments are selected to provide a coating system that has good adhesion to the substrate and between adjacent layers of the system.

On cementitious substrates and especially on cement fiberboard substrates, It can be difficult to obtain adequate adhesion of coatings such as sealer 20 or topcoat 22 to edge 24 or to corners or grooves (not shown in FIG. 1) where the surface has a low radius of curvature. This difficulty can be aggravated when applying coatings to sawn fiber cement products, especially if the sawing process has burnished the product. The disclosed method can appreciably improve coating adhesion at such burnished regions and at edges, corners or grooves proximate the burnished regions. The disclosed method can also improve coating adhesion on the major surface or sides of a cementitious fiberboard substrate. In additional embodiments of the disclosed method a portion of a cementitious substrate (e.g., a burnished edge, corner or groove of a cement fiberboard substrate) is pretreated with an aqueous solution of an acid or salt of such an acid that affords improved coating adhesion on a cementitious substrate; a sealing layer respectively containing the above-mentioned first or second aqueous mixtures is applied to the thus-pretreated substrate and at least partially dried; and then overcoated with one or more topcoat layers. For example, the pretreatment may be applied to at least one edge such as edge 24, to all such edges, to any or all corners where such edges meet, to any or all sides such as side 26, to first major surface 14 or to both first major surface 14 and to the other major surface (not shown in FIG. 1) of article 10. The applied pretreatment preferably is dried sufficiently so that the pretreated region no longer has a wet appearance. One or more of a sealer, primer or topcoat is applied atop at least the pretreated region and desirably atop other nearby regions such as the sides and one or both major faces of substrate 12. For example, a sealer, primer or topcoat may be applied only to burnished regions and at least one edge, corner or groove proximate the burnished region (e.g., over the burnished region and extending at least about 3, at least about 5 or at least about 10 cm beyond such edge, corner or groove into an unburnished area); to all edges, sides and ends of the substrate; or to all edges, sides and ends and to at least one and if desired also to one or both major face(s) of the substrate.

The disclosed aqueous pretreatment solution may be referred to as an optional aqueous solution since it need not always be used. It and the various above-mentioned aqueous mixtures or aqueous coating compositions may conveniently be applied to a substrate at a location where such substrate is manufactured prior to shipment to another location, or may be applied to a substrate at an intended final use location, such as after attachment of a substrate to a building or other surface. When applied at a manufacturing location to a substrate that will be dried, the optional aqueous solution and disclosed aqueous mixtures or aqueous coating compositions may be applied before or after or both before and after the article is subjected to drying (e.g., oven drying, for example to remove water). For coatings on cement fiberboard, it normally will be most convenient to apply the optional aqueous solution and disclosed aqueous mixtures or aqueous coating compositions after a board has been formed and before it is dried to remove water from the fiberboard binder, as the drying step will also remove water from the aqueous solution and aqueous mixture. The optional aqueous solution and disclosed aqueous mixtures or aqueous coating compositions may be applied using any convenient method including brushing (e.g., using a brush coater), direct roll coating, reverse roll coating, flood coating, vacuum coating, curtain coating and spraying. The various techniques each offer a unique set of advantages and disadvantages depending upon the substrate profile, morphology and tolerable application efficiencies.

A variety of substrates may be coated using the disclosed methods and coating compositions. Exemplary substrates include wood, metals, plastics and cementitious substrates (e.g., concrete and cement fiberboard). The disclosed methods, articles and coating compositions have particular value when the substrate is cement fiberboard. Cement fiberboard usually contains a composite of fibers (e.g., wood pulp, glass or polymeric fibers) and a binder which includes water, silica and hydraulic cement (e.g., Portland cement). Cement fiberboard substrates may be made using methods such as extrusion, the Hatschek method, or other methods known in the art, e.g., as described in U.S. Pat. Nos. 3,219,467, 3,781,396, 6,030,447, 6,346,146, 6,506,248, 6,635,735, 6,893,751 and 6,941,720; U.S. Patent Application Nos. US 2003/0089061 A1, US 2005/0208285 A1 and US 2006/0288909 A1; Australian Patent Application Nos. 198060655 A1 and 2005100347; and International Patent Application Nos. WO 98/45222 A1 and WO 01/68547 A1. An uncoated cement fiberboard substrate surface typically contains a plurality of pores with micron- or submicron-scale cross-sectional dimensions. A variety of suitable cement fiberboard substrates are commercially available. For example, several preferred fiber cement siding products are available from James Hardie Building Products Inc. of Mission Viejo, Calif., including those sold as HARDIEHOME™ siding, HARDIPANEL™ vertical siding, HARDIPLANK™ lap siding, HARDIESOFFIT™ panels, HARDITRIM™ planks and HARDISHINGLE™ siding. These products are available with an extended warranty, and are said to resist moisture damage, to require only low maintenance, to not crack, rot or delaminate, to resist damage from extended exposure to humidity, rain, snow, salt air and termites, to be non-combustible, and to offer the warmth of wood and the durability of fiber cement. Other suitable fiber cement siding substrates include AQUAPANEL™ cement board products from Knauf USG Systems GmbH & Co. KG of Iserlohn, Germany, CEMPLANK™, CEMPANEL™ and CEMTRIM™ cement board products from Cemplank of Mission Viejo, Calif.; WEATHERBOARDS™ cement board products from CertainTeed Corporation of Valley Forge, Pa.; MAXITILE™, MAXISHAKE™ AND MAXISLATE™ cement board products from MaxiTile Inc. of Carson, Calif.; BRESTONE™, CINDERSTONE™, LEDGESTONE™, NEWPORT BRICK™, SIERRA PREMIUM™ and VINTAGE BRICK™ cement board products from Nichiha U.S.A., Inc. of Norcross, Ga., EVERNICE™ cement board products from Zhangjiagang Evernice Building Materials Co., Ltd. of China and E BOARD™ cement board products from Everest Industries Ltd. of India.

A variety of water-dispersible polyisocyanates may be employed in the disclosed compositions, methods and articles. The polyisocyanates include at least two reactive isocyanate groups, e.g., two to four aliphatically, cycloaliphatically, araliphatically or aromatically bound isocyanate groups. The polyisocyanates desirably are free of or substantially free of hydroxyl, primary amino, and secondary amino groups. The water-dispersible polyisocyanate may be previously dispersed in a non-reactive medium or in an aqueous medium prior to mixing with the isocyanate-reactive compound or it may be dispersed in such compound (e.g., dispersed in the presence of an isocyanate-reactive emulsion polymer). Exemplary water-dispersible polyisocyanates and methods of making them are described in U.S. Pat. Nos. 4,663,377, 4,904,522, 5,075,370, 5,157,074, 5,185,200, 5,191,012, 5,200,489, 5,202,377, 5,212,230, 5,221,710, 5,236,994, 5,252,696, 5,468,804, 5,563,207 and 6,007,619. A range of aliphatic water-dispersible polyisocyanates is available from Bayer MaterialScience AG under the BAYHYUR™ name, for example BAYHYDUR 302, 303, 304, 305, 401-70, VP LS 2150 BA, VP LS 2150/1, VP LS 2240, VP LS 2306, VP LS 2310, VP LS 2319, VP LS 2336, XP 2487/1, XP 2547, XP 2570 and XP 7165. A range of aromatic water-dispersible aromatic polyisocyanates is available from Huntsman Corporation under the RUBINATE™ and SUPRASEC™ names, for example methylene diphenyl diisocyanate (MDI) polyisocyanates such as RUBINATE 9236, RUBINATE 9259 and SUPRASEC 9600.

The aqueous mixtures in the disclosed compositions, methods and articles may contain a variety of water-soluble acids (or salts of such acids) that afford improved coating adhesion on a cementitious substrate. Without intending to be bound by theory, such adhesion improvement may for example arise due to etching, surface reaction or surface cleaning. The acid or acid salt may for example have a water solubility of at least 5 wt. %, at least 10 wt. %, at least 20 wt. %, at least 50 wt. % or complete water miscibility. Exemplary acids may be inorganic or organic acids, and if organic may be monomeric or oligomeric. The acid may be a silicic or non-silicic acid. If desired, a precursor to the acid such as an acid anhydride, acid halide (including inorganic acid halides such as Lewis acids and organic acid halides), or ester can be used in place of or in addition to the acid itself, e.g., to generate the desired acid in situ. Exemplary water-soluble acid salts include sodium, potassium and ammonium salts, and various other water-soluble metal salts including water-soluble magnesium, calcium and iron salts. Mixtures of acids, acid anhydrides and acid salts may be employed, including mixtures which buffer the coating composition pH.

Exemplary acids include carboxylic acids such as acetic acid ($C_2H_4O_2$, CAS RN 64-19-7), maleic acid ($C_4H_4O_4$, CAS RN 110-16-7), citric acid ($C_6H_8O_7$, CAS RN 77-92-0), formic acid ($CH_2O_2$, CAS RN 64-18-6) and benzoic acid ($C_7H_6O_2$, CAS RN 65-86-0); sulfonic acids; phosphorus acids (discussed in more detail below); silicic acids (also discussed in more detail below); nitric and nitrous acids; hydrogen halides such as hydrogen fluoride, hydrogen chloride, hydrogen bromide and hydrogen iodide; other mineral acids such as boric acid and sulfuric acid; and phenols. Exemplary phosphorus acids include phosphoric acid ($H_3PO_4$, CAS RN 7664-38-2), phosphonic acid ($H_3PO_3$, CAS RN 13598-36-2), phosphinic acid ($H_3PO_2$, CAS RN 6303-21-5), ethyl phosphonic acid ($C_2H_7O_3P$, CAS RN 15845-66-6) and hypophosphoric acid ($H_2PO_3$, CAS RN 7803-60-3). Exemplary water-soluble phosphorus acid salts include ammonium dihydrogen phosphate ($NH_4H_2PO_4$, CAS RN 7722-76-1), diammonium hydrogen phosphate (($NH_4)_2HPO_4$, CAS RN 7783-28-0), calcium dihydrogen phosphate ($Ca(H_2PO_4)_2$, CAS RN 7758-23-8), calcium monohydrogen phosphate dihydrate ($CaHPO_4.2H_2O$, CAS RN 7789-77-7), calcium phosphate tribasic ($Ca_3(PO_4)_2.H_2O$, CAS RN 7758-87-4), ferric phosphate ($FePO_4$, CAS RN 10045-86-0), lithium orthophosphate ($Li_3PO_4$, CAS RN 10377-52-3), magnesium ammonium phosphate hydrate (($NH_4)MgPO_4$, CAS RN 7785-21-9), magnesium hydrogen phosphate trihydrate ($MgHPO_4.3H_2O$, CAS RN 7757-86-0), potassium dihydrogen phosphate ($KH_2PO_4$, CAS RN 7778-77-0), dipotassium hydrogen phosphate ($K_2HPO_4$, CAS RN 7758-11-4), dipotassium hydrogen phosphate trihydrate ($K_2HPO_4.3H_2O$, CAS RN 16788-57-1), potassium orthophosphate ($K_3PO_4$, CAS RN 7778-53-2), potassium diphosphate ($K_4P_2O_7$, CAS RN 7320-34-5), sodium dihydrogen phosphate ($NaH_2PO_4$, CAS RN 7558-80-7), sodium phosphate monobasic monohydrate ($NaH_2PO_4.H_2O$, CAS RN 10049-21-5), disodium hydrogen phosphate ($Na_2HPO_4$, CAS RN 7558-79-4), disodium phosphate dibasic dodecahydrate ($Na_2HPO_4.12H_2O$, CAS RN 10039-32-4), disodium phosphate dibasic heptahydrate ($Na_2HPO_4.7H_2O$, CAS RN 7782-85-6), trisodium phosphate ($Na_3PO_4$, CAS RN 7601-54-9), sodium phosphate tribasic dodecahydrate ($Na_3PO_4.12H_2O$, CAS RN 10101-89-0), sodium metaphosphate ($NaPO_3$, CAS RN 10361-03-2), disodium pyrophosphate ($Na_2H_2P_2O_7$, CAS RN 7758-16-9), tetrasodium pyrophosphate ($Na_4O_7P_2$, CAS RN 7722-88-5), sodium trimetaphosphate ($Na_3P_3O_9$, CAS RN 7785-84-4), sodium tripolyphosphate ($Na_5O_{10}P_3$, CAS RN 13573-18-7), hexasodium tetraphosphate ($Na_6O_{13}P_4$, CAS RN 14986-84-6) and sodium polymetaphosphate (CAS RN 50813-16-6). Exemplary silicic acids include metasilicic acid ($H_2SiO_3$, CAS RN 7699-41-4), orthosilicic acid ($H_4SiO_4$, CAS RN 1343-98-2), disilicic acid ($H_2Si_2O_5$), and pyrosilicic acid ($H_6Si_2O_7$). Exemplary water-soluble silicic acids (viz., water-soluble silicate salts) include lithium silicate, potassium silicate, sodium silicate, ammonium silicate, and salts described in Published PCT Application No. WO/2007/089913 A1. Exemplary silicate salts are available through a variety of chemical suppliers. For example, sodium silicate (sometimes referred to as waterglass) is available in a variety of forms including sodium orthosilicate ($Na_4SiO_4$), sodium metasilicate ($Na_2SiO_3$), sodium polysilicate (($Na_2SiO_3$)n) and sodium pyrosilicate ($Na_6Si_2O_7$). Sodium silicate and potassium silicate (sometimes referred to as potassium waterglass) are available under a variety of names from PQ Corporation, Valley Forge, Pa. When a water-soluble silicate salt is employed, the disclosed coating composition may in some embodiments desirably be provided as a three-component system with, for example, a first part containing an emulsion of an isocyanate-reactive emulsion polymer in an aqueous phase containing a water-soluble non-silicic acid or salt; a second part containing an aqueous dispersion of the water-dispersible polyisocyanate; and a third part containing an aqueous solution of the water-soluble silicate.

Acids and salts having appreciable water solubility (e.g., at least 5 wt. %, at least 10 wt. %, at least 20 wt. %, at least 50 wt. % or complete water miscibility) are preferred, as are acids and salts providing low viscosity aqueous solutions, and acids and salts having low toxicity and low or moderate tendency to irritate the skin. Carboxylic acids, phosphoric acids, silicic acids, alkylsulfonic acids and arylsulfonic acids are preferred, as are ammonium or sodium salts of acids. Citric acid, phosphoric acid and their corresponding ammonium or sodium salts are especially preferred.

The aqueous mixtures in the disclosed compositions, methods and articles may optionally contain a variety of isocyanate-reactive compounds other than water, e.g., amines, amino compounds, alcohols, acetoacetoxy compounds, malonate compounds, aspartic ester compounds and the like. The isocyanate-reactive compound preferably is an isocyanate-reactive emulsion polymer. Exemplary isocyanate-reactive emulsion polymers may be prepared through chain-growth polymerization, using two or more ethylenically unsaturated monomers, at least one of which will directly or indirectly provide an active hydrogen-containing group or groups (e.g., a hydroxyl, primary amino, secondary amino, phosphate or acetoacetoxy group) that will react more rapidly than carboxyl groups with isocyanate groups on the water-dispersible polyisocyanate. The desired active hydrogen-containing group(s) may be provided by one or more of the monomers from which the emulsion polymer is formed. For example, an acrylic latex emulsion polymer may be functionalized with hydroxyl groups by including a hydroxyl-functional monomer (e.g., hydroxyethyl acrylate or hydroxyethyl methacrylate) in the mixture of monomers from which the emulsion polymer particles are formed. Similarly, an acrylic latex emulsion polymer may be functionalized with secondary amino groups by including an amino-functional monomer (e.g., tert-butyl amino ethyl methacrylate) in the mixture of monomers from which the emulsion polymer particles are formed. The desired active-hydrogen-containing group(s) may instead or also be provided by reacting an appropriate site on the polymer to add a pendant group containing the desired active hydrogen-containing group. For example, an emulsion polymer may be functionalized with primary amino groups by including a carboxyl-functional monomer (e.g., acrylic acid, methacrylic acid or acetoethyl methacrylate) in the mixture of monomers from which the emulsion polymer particles are formed, and then reacting at least part of the resulting carboxyl functionality with methyl aziridine.

Non-limiting examples of ethylenically unsaturated monomers include monomers such as methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, hydroxypropyl acrylate, hydroxypropyl methacrylate, tert-butyl amino ethyl acrylate, tert-butyl amino ethyl methacrylate, glycidyl acrylate, glycidyl methacrylate, 4-hydroxybutyl acrylate glycidylether, 4-hydroxybutyl methacrylate glycidylether, acrylamide, methylacrylamide, diacetone acrylamide, methylol (meth)acrylamide, acrylonitrile, styrene, a-methyl styrene, vinyl toluene, vinyl acetate, vinyl propionate, allyl methacrylate, acrylic acid, methacrylic acid, and mixtures thereof. An exemplary hydroxyl-functionalized acrylic latex is available from Engineered Polymer Solutions Inc. as EPS-2771, and other exemplary hydroxyl-functionalized acrylic lattices are available from Rohm & Haas Company and from DSM Neo-Resins. An exemplary primary amino-functionalized acrylic latex is available from DSM NeoResins as NEOCRYL™ XK-90. The emulsion polymer may be a single stage or multistage polymer. Further details regarding multistage polymer formation may be found, for example, in U.S. Patent Application Publication No. US 2007/0110981 A1. The emulsion polymer may also include silane functionality as described in the same published application, or acetoacetyl functionality as described therein and in U.S. Patent Application Publication Nos. US 2006/0135684 A1 and US 2006/0135686 A1. The disclosed coating compositions may also include non-isocyanate-reactive emulsion polymers. A variety of such non-isocyanate-reactive emulsion polymers may be employed. An exemplary commercially available polymer is AIRFLEX™ EF811 vinyl acetate-ethylene (VAE) latex emulsion from Air Products and Chemicals, Inc.

The emulsion polymer typically is stabilized to aid in creating and maintaining a dispersion or emulsion of the polymer particles in water. For example, the emulsion polymer may be stabilized by forming the polymer particles in the presence of one or more nonionic or anionic emulsifiers (e.g., surfactants), used alone or together. Exemplary nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)-phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with ethylene oxide, N-polyoxyethylene(20)lauramide, N-lauryl-N-polyoxyethylene(3)amine and poly(10)ethylene glycol dodecyl thioether. Exemplary anionic emulsifiers include sodium lauryl sulfate, sodium dodecylbenzene-sulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium, potassium, or ammonium salts of phosphate esters of ethoxylated nonylphenol or tridecyl alcohol, sodium octoxynol-3-sulfonate, sodium cocoyl sarcocinate, sodium 1-alkoxy-2-hydroxypropyl sulfonate, sodium alpha-olefin ($C_{14}$-$C_{16}$)sulfonate, sulfates of hydroxyalkanols, tetra-sodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate.

The emulsion polymer may also be stabilized by preparing the polymer particles under alkaline conditions in the presence of an alkali-soluble polymer (e.g., a polymer containing acetoacetyl-functionality), or by making the emulsion polymer itself alkali soluble and preparing the polymer particles under alkaline conditions. For example, the emulsion polymer may be made alkali-soluble by employing a portion of acrylic or methacrylic acid or other polymerizable acid monomer (e.g., at more than about 5 or more than about 7 weight % of the starting monomer mix) and solubilizing the polymer by addition of a nitrogen-free base (e.g., an inorganic metal base such as KOH, CaOH, NaOH, LiOH, etc.) or a tertiary amine such as triethylamine. The use of such bases will be less likely to promote premature gelation of the water-dispersible isocyanate than would be the case if ammonia or a primary or secondary amine were to be used to solubilize the emulsion polymer. A range of exemplary alkali-soluble emulsion polymers is available from BASF under the JONCRYL™ name. Another exemplary process for preparing alkali soluble emulsion polymers is described in U.S. Pat. No. 5,962,571. Emulsion polymers having acidic functionality may in some cases be stabilized or further stabilized via neutralization using ammonia or an amine.

The emulsion polymer may conveniently be prepared using one or more water-soluble free radical initiators to promote chain-growth polymerization. Initiators suitable for use in coating compositions will be known to persons having ordinary skill in the art or can be determined using standard methods. Representative water-soluble free radical initiators include hydrogen peroxide; tert-butyl peroxide; alkali metal persulfates such as sodium, potassium and lithium persulfate; ammonium persulfate; and mixtures of such initiators with a reducing agent. Representative reducing agents include sulfites such as alkali metal metabisulfite, hydrosulfite, and hyposulfite; sodium formaldehyde sulfoxylate; and reducing sugars such as ascorbic acid and isoascorbic acid. The amount of initiator is preferably from about 0.01 to about 3 weight %, based on the total monomer amount. In a redox system the amount of reducing agent is preferably from 0.01 to 3 weight %, based on the total amount of monomer. The polymerization reaction may for example be performed at a temperature in the range of from about 10 to about 100° C.

The above-mentioned BAYHYDROL water-dispersible polyisocyanates are sometimes combined with water-dispersible acrylic resins made using a solvent such as butyl acetate and stabilized by virtue of carboxyl functionality in the resin particles. If not stripped from the product, the solvent represents a potential source of volatile organic compounds (VOCs) and in any event its use during the resin synthesis represents an increased cost. The disclosed emulsion polymers may be formed in water and stabilized using a secondary (viz., external) dispersing or emulsifying agent. The emulsion polymers desirably have higher molecular weights than the above-mentioned acrylic resins, and desirably provide coating compositions with faster drying times since the coalescing polymer film will in effect have a head start on molecular weight buildup. This can provide an advantage when stacking coated sheet articles (even those coated only at the edges) as the coated articles may be less likely to exhibit blocking.

The disclosed aqueous mixtures of water-dispersible polyisocyanate and water-soluble acid or salt may for example contain on a solids basis about 60 to about 99 wt. %, about 70 to about 99 wt. % or about 80 to about 95 wt. % water-dispersible polyisocyanate, and about 1 to about 40 wt. %, about 1 to about 30 wt. % or about 5 to about 20 wt. % water-soluble acid or salt.

The disclosed aqueous mixtures of water-dispersible polyisocyanate, water-soluble acid or salt and isocyanate-reactive compound may for example contain on a solids basis about 5 to about 40 wt. %, about 5 to about 30 wt. % or about 5 to about 20 wt. % water-dispersible polyisocyanate; about 1 to about 40 wt. %, about 1 to about 30 wt. % or about 5 to about 20 wt. % water-soluble acid or salt; and about 95 to about 20 wt. %, about 95 to about 40 wt. % or about 90 to about 60 wt. % isocyanate-reactive compound.

Some of the disclosed coated articles may be made using an aqueous mixture of water-dispersible polyisocyanate and isocyanate-reactive emulsion polymer, which mixture may for example contain on a solids basis about 1 to about 75 wt. %, about 5 to about 60 wt. % or about 10 to about 50 wt. % water-dispersible polyisocyanate and about 99 to about 25 wt. %, about 95 to about 40 wt. % or about 90 to about 50 wt. % isocyanate-reactive emulsion polymer, with the water-dispersible polyisocyanate and isocyanate-reactive emulsion polymer being present in amounts sufficient to provide a stoichiometric excess, equality or deficiency of isocyanate groups to isocyanate-reactive groups. The ratio of isocyanate groups to isocyanate-reactive groups may for example range from about 0.1 to about 5 or from about 0.5 to 2.

The various disclosed aqueous mixtures may for example have an overall solids level of about 1 to about 50 wt. % based on the weight of the mixture including water and any other volatile solvents present in the mixture. When the aqueous mixtures contain an acid and salt which buffer the coating composition, the amounts and types of acid and salt may for example provide an aqueous mixture having a pH of about 5 to about 9 or about 6 to about 8.

The disclosed aqueous mixtures or aqueous coating compositions may contain a variety of adjuvants which will be familiar to persons having ordinary skill in the art or which can be determined using standard methods. For example, the mixtures or coating compositions may contain one or more optional coalescents to facilitate one or more of component compatibility, film formation, or reduction in the minimum film forming temperature (MFFT). Exemplary coalescents include glycol ethers such as EASTMAN™ EP, EASTMAN DM, EASTMAN DE, EASTMAN DP, EASTMAN DB and EASTMAN PM from Eastman Chemical Co. and ester alcohols such as TEXANOL™ ester alcohol from Eastman Chemical Co. Preferably, the optional coalescent is a low VOC coalescent such as is described in U.S. Pat. No. 6,762,230 B2. Additional exemplary low VOC coalescents that may be used include benzyl butyl phthalate, dibutyl phthalate, dioctyl phthalate, triphenyl phosphate, 2-ethylhexyl benzylphthalate, butyl cyclohexyl phthalate, mixed benzoic acid and fatty acid esters of pentaerythritol, polypropylene adipate)dibenzoate, diethylene glycol dibenzoate, tetrabutylthiodisuccinate, butyl phthalyl butyl glycolate, tributyl citrate, acetyl tributyl citrate, dibenzyl sebacate, tricresyl phosphate, toluene ethyl sulfonamide, the di-2-ethylhexyl ester of hexamethylene glycol diphthalate, di(methylcyclohexyl)phthalate, tributoxyethyl phosphate, tributyl phosphate and mixtures thereof. The mixtures or coating compositions preferably include a low VOC coalescent in an amount of at least about 0.5 weight %, more preferably at least about 1 weight %, and yet more preferably at least about 2 weight %. The mixtures or coating compositions also preferably include a low VOC coalescent in an amount of less than about 10 weight %, more preferably less than about 6 weight %, and yet more preferably less than about 4 weight %, based on the emulsion polymer weight.

The disclosed aqueous mixtures or aqueous coating compositions may include a surface-active agent (surfactant) that modifies the interaction of the mixture or coating composition with the substrate or with a prior applied coating. Representative modifications may for example involve handling, spreading, bonding, wetting, leveling, foaming, flow control or other properties. If used, the surface-active agent is preferably present in an amount of less than 5 weight %, based on the total coating composition weight. Exemplary surface-active agents include those listed in the above-mentioned U.S. Patent Application Publication No. US 2007/0110981 A1.

The disclosed aqueous mixtures or aqueous coating compositions may also contain one or more other adjuvants including anti-cratering agents, anti-migration aids, anti-oxidants, biocides, coalescing agents, colorants, curing agents, curing indicators, dispersants, dyes, fillers, flatting agents, fungicides, glycols, heat stabilizers, humectants, inert ingredients, mar and abrasion additives, mildewcides optical brighteners, pigments, plasticizers, preservatives, rheology control agents, sedimentation inhibitors, thickeners, ultraviolet-light absorbers, wax emulsions and the like such as those described in the above-mentioned U.S. Patent Application Publication No. US 2007/0110981 A1; in Koleske et al., Paint and Coatings Industry, April, 2003, pages 12-86; or as may be familiar to those skilled in the art. The chosen adjuvants often will be selected empirically in order to obtain desired property modifications or performance characteristics for the mixtures or coating compositions when they are stored, handled, or applied, and at other or subsequent stages. Exemplary performance characteristics may include chemical resistance, abrasion resistance, hardness, gloss, reflectivity, appearance, or combinations of these characteristics, and other similar characteristics. Preferably the chosen adjuvants do not substantially react with active isocyanate groups or isocyanate-reactive groups sufficiently to unduly shorten the aqueous mixture or coating composition pot life.

The disclosed aqueous mixtures or aqueous coating compositions preferably have a MFFT about 0 to about 55° C., more preferably about 0 to about 20° C., when tested with a Rhopoint 1212/42, MFFT Bar-60, available from Rhopoint Instruments Ltd. of East Sussex, United Kingdom. The mixtures or coating compositions preferably have a PVC (pigment volume concentration) of less than about 50 percent, more preferably less than about 35 percent, and most preferably less than about 25 percent. The mixtures or coating compositions preferably include less than 10 weight %, more preferably less than 7 weight %, and most preferably less than 4 weight % total VOCs based upon the total mixture or composition weight.

The disclosed methods and coated articles may as noted above be pretreated with an aqueous solution of acid (or salt thereof) that affords improved coating adhesion on a cementitious substrate. This pretreatment is especially desirable on or near burnished edge, corner or grooved regions, particularly when used in combination with aqueous mixtures or aqueous coating compositions containing the disclosed water-soluble acid or salt thereof. The concentration of acid or salt in the pretreatment solution may vary depending on the chosen acid or salt in the pretreatment solution (and in the mixture or coating composition, if employed), and may be determined or adjusted empirically using the tape adhesion test described below. There may be an optimal concentration range below and above which reduced topcoat adhesion may be observed. For example, concentrations of about 1 to about 86, about 2 to about 75, about 5 to about 60, about 8 to about 40, or about 10 to about 30 wt. % acid or salt in water may be employed, based on the total weight of the pretreatment solution. In one embodiment, the amount of acid or salt in the pretreatment solution is from about 1 to about 30 weight % based on the total weight of the solution. A variety of acids and salts thereof may be employed, including the acids and salts listed above in connection with the disclosed aqueous mixtures, with phosphorus acids and salts being preferred and with sodium or ammonium salts of phosphorus acids being especially preferred.

Following application of the disclosed aqueous mixtures or aqueous coating compositions, a variety of additional sealers may optionally be employed. Representative additional sealers typically will be water-based and include acrylic latex materials (for example, unpigmented or low pigment level latex solutions containing between about 2 and 50 wt. % solids) and water-dispersible materials (for example, unpigmented or low pigment level water-dispersible polyurethane solutions containing between about 2 and 50 wt. % solids). The additional sealer may for example provide one or more features such as improved adhesion, efflorescence blocking, water resistance or block resistance. An example of a commercially available additional sealer is OLYMPIC™ FC sealer (available from PPG). Other additional sealers include those described in U.S. Provisional Application Nos. 60/737,442 (filed Nov. 15, 2005); 60/764,044, 60/764,103, 60/764,131 and 60/764,242 (each of which was filed Jan. 31, 2006); 60/802,185 and 60/802,186 (both filed May 19, 2006); 60/810,739 (filed Jun. 2, 2006) and 60/819,505 (filed Jul. 7, 2006); those described in U.S. Patent Application Publication Nos. US 2007/0110981 A1, US 2007/0259166 A1, US 2007/0259188 A1, US 2007/0269660 A1, US 2007/0282046 A1 and US 2008/0008895 A1; and those described in PCT Published Application Nos. WO/2007/059516 A1, WO/2007/089807 A1, WO/2007/090131 A1, WO/2007/090132 A1 and WO/2007/089913 A1. The additional sealer may also contain an adhesion-enhancing amount of water-soluble acid or salt thereof in amounts like those described above for the disclosed mixtures, with phosphorus acids and salts being preferred and sodium or ammonium salts of phosphorus acids being especially preferred. Inclusion of such an acid or salt in the additional sealer may provide a substantial improvement in adhesion to underlying or overlying layers. A recommended thickness for the additional sealer after it is dried or otherwise hardened is about 0.001 to about 0.3 mm.

A variety of primers may optionally be employed in the present invention. Representative primers include acrylic latex or vinyl primers. The primer may include color pigments, if desired. Preferred primers have a measured 60° gloss value less than 15 gloss units, more preferably less than 10 gloss units, and most preferably less than 5 gloss units, and a pigment volume concentration (PVC) of at least 5%. Preferred primers also provide blocking resistance. A recommended thickness for the primer after it is dried or otherwise hardened is about 2 to 50 micrometers and more preferably about 5 to about 30 micrometers.

A variety of final topcoat compositions may be employed in the present invention. Representative topcoats are described in the above-mentioned U.S. Provisional Application Nos. 60/737,442, 60/764,044, 60/764,103, 60/764,131, 60/764,242, 60/802,185, 60/802,186, 60/810,739 and 60/819,505; in the above-mentioned U.S. Patent Application Publication Nos. US 2007/0110981 A1, US 2007/0259166 A1, US 2007/0259188 A1, US 2007/0269660 A1, US 2007/0282046 A1 and US 2008/0008895 A1; and those described in the above-mentioned PCT Published Application Nos. WO/2007/059516 A1, WO/2007/089807 A1, WO/2007/090131 A1, WO/2007/090132 A1 and WO/2007/089913 A1. The topcoat preferably provides sufficient protection for the underlying coating(s) so that the coated article is one or more and preferably all of chalk resistant, color change resistant and crack resistant. The topcoat preferably includes a multistage latex polymer as described in the above-mentioned U.S. Patent Application Publication No. US 2007/0110981 A1. The topcoat typically will include a carrier (e.g., water or one or more organic solvents), may include other ingredients such as color pigments if desired, and in some embodiments may be characterized as a paint. Preferred final topcoat compositions have a measured 60° gloss value greater than 1 gloss unit, and more preferably between 5 and 30 gloss units.

A Wet Adhesion Test may be carried out as follows to evaluate adhesion of a coating system after a coated cement fiberboard substrate has been saturated with water. According to this test procedure, coated substrates (e.g., cement fiberboards) are soaked in room temperature water for at least 24 hours. After soaking, the boards are removed from the water and dried at room temperature for about 3 hours. A six-inch (15.24 cm) length of 3M HD 250 tape is applied to the surface of the board with the long axis of the tape in the direction of any embossing patterns that may be present. The tape is firmly pressed onto the board ensuring full contact. The tape is then removed by quickly pulling it off at a 90-degree angle to the board. "Wet Adhesion" performance is rated based on the percent of coating removed from the cement board. Performance is further assessed by noting where any failure occurs. For example, failure may occur between interfacial coating layers, between the coating and the surface of the board, or within the board itself. Preferred aqueous mixtures or aqueous coating compositions typically have less than 25% coating removal, preferably less than 15% coating removal, more preferably less than 10% coating removal and yet more preferably less than 5% coating removal. Desirably when using the above-mentioned pretreatment or the above-mentioned aqueous mixtures containing an acid or salt of such acid, the acid or salt amount is such as to provide such levels of coating removal. In addition, the coating failure mode preferably is within the board as indicated by a significant amount of fiber from the board adhering to the removed coating.

For use in extreme climates the disclosed coated articles preferably will withstand at least 30 freeze-thaw cycles when submerged samples are tested using ASTM D6944-03, Test Method A. As written, this ASTM test method recites a 30-cycle sequence. However, rather than simply grade a specimen as a "pass" at the end of 30 cycles, the test desirably is lengthened to include additional cycles. More preferably, the coated articles can withstand at least 75 freeze-thaw cycles, most preferably at least 125 freeze-thaw cycles and optimally at least 175 freeze-thaw cycles.

The invention will be further described in the following non-limiting examples in which all parts and percentages are by weight unless otherwise indicated.

Example 1

An emulsion polymer (Emulsion Polymer A) was prepared from a monomer mixture containing ethyl hexyl acrylate, styrene, hydroxyethyl acrylate (at 10% based on the total monomer weight), methacrylic acid and acetoacetoxyethylmethacrylate, together with an initiator and emulsifier, to provide a hydroxyl-functional emulsion polymer containing about 48% solids and having a hydroxyl number of about 47 and a calculated Tg of about 45° C. Emulsion Polymer A may be applied as is to a cement fiberboard substrate. However, when this is done poor adhesion is observed over most of the applied areas including major face surfaces, near burnished regions and especially near edges, corners or grooves proximate the burnished regions. This can be demonstrated using ARTISAN™ lap siding (from James Hardie Building Products Inc. of Mission Viejo, Calif.) sawn with a tile saw to provide cut pieces exhibiting burnished cut sides and edges. In a control run, Emulsion Polymer A is applied directly to a cut piece, dried in a 149° C. high velocity hot air oven until the substrate surface temperature reached about 71° C., then overcoated with a multistage latex topcoat like that described in Example 10 of the above-mentioned U.S. Patent Application Publication No. US 2007/0110981 A1. When evaluated using the above-described Wet Adhesion Test, the coated major face of the control cut piece exhibits 50% or greater adhesion loss and the burnished portions exhibit about 90% adhesion loss.

An aqueous mixture of water-dispersible polyisocyanate and Emulsion Polymer A was prepared by combining the ingredients shown below in Table 1:

TABLE 1

| Ingredient | Amount, % |
|---|---|
| BAYHYDUR 304 polyisocyanate (from Bayer MaterialScience AG) | 5.00 |
| Emulsion Polymer A | 50.0 |
| Deionized Water | 40.3 |
| Coalescent | 4.7 |
| BYK ™-035 defoamer (from Altana) | 0.05 |
| Surfactant | 0.1 |
| Dibutyltin dilaurate catalyst | 0.03 |
| Total | 100.2 |

The ingredients were combined in two parts, with the polyisocyanate in the first part and Emulsion Polymer A in the second part, then mixed to provide an aqueous mixture containing 20% solids. This aqueous mixture has a pot life of about three to four hours at room temperature and may be left overnight without gelling. Non-pretreated cut pieces were dried in the high velocity hot air oven and cooled until the substrate surface temperature reached about 38 to 43° C. Acid salt-pretreated cut pieces were prepared by flooding them with sufficient 15% sodium dihydrogen phosphate ($NaH_2PO_4$) solution to provide about 14.5 $g/m^2$ phosphate salt on the treated surface, then similarly dried and cooled. Two experimental runs, identified below in Table 2 as Run Nos. 1 and 2, were performed by applying the Table 1 aqueous mixture to the untreated cut pieces (Run No. 1) and to the pretreated cut pieces (Run No. 2), dried in the high velocity hot air oven until the substrate surface temperature reached about 71° C. and cooled until the substrate surface temperature reached about 38 to 43° C. The thus-sealed pieces were overcoated with a multistage latex topcoat and dried and cooled as described above. Two further experimental runs, identified below in Table 2 as Run Nos. 3 and 4, were performed by adding 3.34 parts of a 30% aqueous solution of $NaH_2PO_4$ and 0.6 parts of a 30% aqueous solution of $NH_4OH$ to 100.2 parts of the Table 1 aqueous mixture, applying the resulting phosphate-containing aqueous mixture to untreated cut pieces (Run No. 3) and to cut pieces pretreated as described above (Run No. 4); dried, cooled and overcoated with a multistage latex topcoat; and then dried and cooled as described above. The cut pieces from Run Nos. 1 through 4 were evaluated for wet adhesion. The results are shown below in Table 2:

TABLE 2

| Run No. | Pretreatment | Acid or Salt in Pretreatment,% | $NaH_2PO_4$ in Aqueous Mixture, % | Burnished Region Wet Adhesion Loss, % |
|---|---|---|---|---|
| 1 | None | None | None | >25 |
| 2 | None | None | 5 | <7 |
| 3 | $NaH_2PO_4$ | 15 | None | <5 |
| 4 | $NaH_2PO_4$ | 15 | 5 | 0 |

The results in Table 2 show that the aqueous mixture of water-dispersible polyisocyanate and isocyanate-reactive emulsion polymer provided improved coating adhesion, and that further improvements were obtained when the substrate was pretreated with a salt of a water-soluble acid or when the salt was added to the aqueous mixture. No adhesion failure was observed when the substrate was pretreated and the salt was added to the aqueous mixture. The resulting prefinished fiber cement siding products have significantly improved coating adhesion, especially near burnished regions and near edges, corners and grooves proximate the burnished regions.

Examples 2-5 and Comparison Example 1

A series of two-component and three-component coating systems was prepared by combining the ingredients shown below in Table 3 in the indicated order. Emulsion Polymer B was prepared from a monomer mixture containing ethyl hexyl acrylate, styrene, butyl methacrylate, methyl methacrylate, acetoacetoxyethylmethacrylate, methacrylic acid and hydroxyethyl acrylate (at 10% based on the total monomer weight) together with an initiator and emulsifier, to provide a hydroxyl-functional emulsion polymer containing about 46% solids and having a hydroxyl number of about 47 and a calculated Tg of about 45° C.:

TABLE 3

| | Example or Comparative Example | | | | |
|---|---|---|---|---|---|
| Ingredient | 2 | 3 | 4 | 5 | Comp. 1 |
| Part A | | | | | |
| Sodium phosphate monobasic monohydrate ($NaH_2PO_4 \cdot H_2O$) | 5.76 | | 5.76 | | |
| Deionized water | 32.76 | 32.76 | 26.76 | 26.76 | 26.76 |
| EPS-2771 hydroxyl-functionalized acrylic latex (48% solids, from Engineered Polymer Solutions Inc.) | 131.4 | 131.4 | | | |

TABLE 3-continued

| Ingredient | Example or Comparative Example | | | | |
|---|---|---|---|---|---|
| | 2 | 3 | 4 | 5 | Comp. 1 |
| Emulsion Polymer B | | | 137.4 | 137.4 | 137.4 |
| Dibutyltin dilaurate | 0.048 | 0.048 | 0.048 | 0.048 | 0.048 |
| Potassium hydroxide, 24% | 10 | | | | |
| Total Part A | 180.0 | 164.2 | 170.0 | 164.2 | 164.2 |
| Part B | | | | | |
| BAYHYDUR 304 Polyisocyanate | 11.16 | 11.16 | 11.16 | 11.16 | 11.16 |
| Deionized Water | 48.12 | 48.12 | 48.12 | 48.12 | 48.12 |
| Total Part B | 59.3 | 59.3 | 59.3 | 59.3 | 59.3 |
| Part C | | | | | |
| KASIL ™ 1 potassium silicate solution (29% solids, from PQ Corp.) | | 103.0 | | 103.0 | |
| Total Part C | | 103.0 | | 103.0 | |

The coating systems shown in Table 3 may be mixed and applied as is, or further diluted with water (e.g., to provide a diluted mixture containing about 20% solids) and then applied. The mixtures have a pot life, and desirably are used before a fall-off in adhesion performance is observed.

Using the method of Example 1, the coating systems of Examples 2 through 5 and Comparative Example 1 were applied as sealers to smooth trim planks and cedar replica planks made from cement fiberboard. The Example 2 through 5 sealers were evaluated both with and without an acid salt pretreatment made using 15% sodium phosphate monohydrate. Prior to sealer application, the smooth trim planks were dried in the high velocity hot air oven until the substrate surface temperature reached about 93° C., whereas the cedar replica planks were dried in the high velocity hot air oven until the substrate surface temperature reached about 71° C. Two plank samples were evaluated in each instance. The topcoated planks were subjected to the Wet Adhesion Test using a 48 hour water soak. The results are shown below in Tables 4 and 5:

TABLE 4

| Run No. | Plank Type | Pre-treat? | Sealer | Adhesion Loss, % | | | |
|---|---|---|---|---|---|---|---|
| | | | | Wet Face | Factory Edge | Wet Back | Average |
| 1 | Smooth Trim | No | Control | 8 | 80 | 75 | 54 |
| 2 | Smooth Trim | No | Ex. 2 | 4 | 60 | 60 | 41 |
| 3 | Smooth Trim | Yes | Ex. 2 | 3 | 7 | 2 | 4 |
| 4 | Smooth Trim | No | Ex. 3 | 2 | 35 | 75 | 37 |
| 5 | Smooth Trim | Yes | Ex. 3 | 4 | 8 | 3 | 5 |
| 6 | Smooth Trim | No | Ex. 4 | 0 | 75 | 20 | 32 |
| 7 | Smooth Trim | Yes | Ex. 4 | 0 | 4 | 9 | 4 |
| 8 | Smooth Trim | No | Ex. 5 | 6 | 50 | 30 | 29 |
| 9 | Smooth Trim | Yes | Ex. 5 | 0 | 2 | 3 | 2 |

TABLE 5

| Run No. | Plank Type | Pre-treat? | Sealer | Adhesion Loss, % | | | |
|---|---|---|---|---|---|---|---|
| | | | | Wet Face | Factory Edge | Wet Back | Average |
| 1 | Cedar Replica | No | Control | 19 | 20 | 80 | 40 |
| 2 | Cedar Replica | No | Ex. 2 | 10 | 5 | 15 | 10 |
| 3 | Cedar Replica | Yes | Ex. 2 | 3 | 5 | 3 | 4 |
| 4 | Cedar Replica | No | Ex. 3 | 10 | 4 | 30 | 15 |
| 5 | Cedar Replica | Yes | Ex. 3 | 12 | 4 | 10 | 9 |
| 6 | Cedar Replica | No | Ex. 4 | 15 | 7 | 60 | 27 |
| 7 | Cedar Replica | Yes | Ex. 4 | 13 | 5 | 4 | 7 |
| 8 | Cedar Replica | No | Ex. 5 | 10 | 3 | 30 | 14 |
| 9 | Cedar Replica | Yes | Ex. 5 | 12 | 5 | 6 | 8 |

The results in Table 4 and Table 5 show that it was somewhat easier to adhere coatings to the smooth trim planks than to the cedar replica planks. The best overall adhesion performance (lowest average percent adhesion loss rating) was obtained using acid salt pretreatment. The differences compared to the control sealer were significant.

Example 6

Smooth trim planks like those used in Table 4 were pretreated on all six sides with an acid salt pretreatment made using 15% sodium phosphate monohydrate, then coated with aqueous coating compositions containing a dispersion of (a) 20% RUBINATE 9259 water-dispersible polyisocyanate (from Huntsman Corporation) in water or (b) 17.4% RUBINATE 9259 and 1.6% sodium phosphate in water. The samples were allowed to air dry for 24 hours, at which point they remained tacky to the touch. In separate runs, a 1.5% ammonia solution was brushed onto the uncured coating compositions immediately following coating application. These latter samples were tack-free to the touch after only about 12 hours air drying time.

The above procedure was repeated using a dispersion of 16% RUBINATE 9259 and 4% potassium silicate in water. The samples were tack-free after 24 hours whether or not an ammonia treatment was employed. However, the potassium silicate dispersions appeared to have significantly shorter pot life than the dispersions made with the polyisocyanate alone or the polyisocyanate and sodium phosphate.

In addition to the above-mentioned methods and coated articles, other embodiments of the invention include such a method or article wherein:
the substrate comprises an unattached cement fiberboard board or plank;

the substrate comprises lap siding, vertical siding, a soffit panel, trim, or a replica of shingles, stone or stucco; or the aqueous mixture is applied to a burnished edge, corner of groove of such substrate.

the coated article has at least one side, edge or groove coated with the aqueous mixture.

All patents, patent applications and literature cited in the specification are hereby incorporated by reference in their entirety. In the case of any inconsistencies, the present disclosure, including any definitions therein will prevail. The invention has been described with reference to various specific and preferred embodiments and techniques. However, it should be understood that many variations and modifications may be made while remaining within the invention.

What is claimed is:

1. A method for preparing a coated article, which method comprises:
    (a) applying to at least a portion of an uncoated cementitious substrate a sealer composition comprising an aqueous mixture comprising water-dispersed polyisocyanate, about 1 to about 40 wt. % of a water-soluble inorganic or water-soluble monomeric or oligomeric organic acid or water-soluble salt thereof in an amount that affords improved coating adhesion on the cementitious substrate, and an optional isocyanate-reactive compound;
    (b) at least partially drying the aqueous mixture; and
    (c) overcoating at least part of such portion with one or more of a further sealer, primer or topcoat.

2. A method according to claim 1 wherein the substrate is a cement fiberboard.

3. A method according to claim 2 wherein the aqueous mixture contains an isocyanate-reactive compound comprising acetoacetoxy groups.

4. A method according to claim 1 wherein the aqueous mixture comprises an inorganic acid.

5. A method according to claim 1 wherein the aqueous mixture comprises a monomeric or oligomeric organic acid.

6. A method according to claim 1 wherein the acid or salt comprises a phosphorus acid or salt.

7. A method according to claim 1 wherein the aqueous mixture comprises a sodium, potassium or ammonium salt.

8. A method according to claim 1 wherein the aqueous mixture comprises a silicate salt.

9. A method according to claim 1 wherein the aqueous mixture contains about 60 to about 99 wt. % water-dispersed polyisocyanate.

10. A method according to claim 1 wherein the aqueous mixture contains the isocyanate-reactive compound.

11. A method according to claim 10 wherein the isocyanate-reactive compound is an emulsion polymer.

12. A method according to claim 11 wherein the isocyanate-reactive emulsion polymer comprises hydroxyl groups.

13. A method according to claim 11 wherein the isocyanate-reactive emulsion polymer is a latex.

14. A method according to claim 11 wherein the isocyanate-reactive emulsion polymer comprises acetoacetoxy groups.

15. A method according to claim 10 wherein the isocyanate-reactive compound comprises acetoacetoxy groups.

16. A method according to claim 1 wherein the aqueous mixture contains about 5 to about 40 wt. % water-dispersed polyisocyanate, and about 95 to about 20 wt. % isocyanate-reactive compound.

17. A method according to claim 1 further comprising pretreating at least a portion of such substrate with an aqueous solution of an acid or salt of such an acid, which acid or salt affords improved coating adhesion on a cementitious substrate, and at least partially drying the aqueous solution prior to applying such aqueous mixture.

18. A method according to claim 1 wherein the aqueous mixture contains an isocyanate-reactive compound comprising hydroxyl groups and acetoacetoxy groups.

* * * * *